United States Patent [19]
Janik et al.

[11] Patent Number: 5,525,225
[45] Date of Patent: *Jun. 11, 1996

[54] FUEL FILTER WITH INTERNAL VENT

[75] Inventors: Leon P. Janik, Suffield; Maxwell M. Craig, Colchester, both of Conn.

[73] Assignee: Stanadyne Automotive Corp., Windsor, Conn.

[*] Notice: The term of this patent shall not extend beyond the expiration date of Pat. No. 5,489,384.

[21] Appl. No.: 316,216

[22] Filed: Sep. 30, 1994

Related U.S. Application Data

[63] Continuation-in-part of Ser. No. 166,226, Dec. 13, 1993.

[51] Int. Cl.⁶ ................................................. B01D 35/01
[52] U.S. Cl. ........................... 210/436; 210/438; 210/450
[58] Field of Search ................................. 210/188, 436, 210/472, 438, 450; 96/204, 219, 220

[56] References Cited

U.S. PATENT DOCUMENTS 3,239,064  3/1966  White ................................. 210/416.4
5,017,285  5/1991  Janik et al. ............................ 210/232
5,382,361  1/1995  Brun ..................................... 210/436
5,413,711  5/1995  Janik ..................................... 210/436

FOREIGN PATENT DOCUMENTS

0442365A2  8/1991  European Pat. Off. .
0547951A1  6/1993  European Pat. Off. .

*Primary Examiner*—Matthew O. Savage
*Attorney, Agent, or Firm*—Chilton, Alix & Van Kirk

[57] ABSTRACT

A fuel filter assembly employs a base which mounts a disposable filter cartridge. A pair of axial conduits in the base provide fluid communication between the base and the cartridge. An axial conduit and at least one baffle positioned on the axial conduit outer surface within the cartridge provide a flow path through the cartridge. An orifice located in the cartridge axial conduit provides a bleed vent which controls the size and flow rate of air bubbles in filtered fuel exiting the fuel filter.

11 Claims, 4 Drawing Sheets

FUEL FILTER WITH INTERNAL VENT

This is a continuation-in-part of co-pending application Ser. No. 08/166,226, filed Dec. 13, 1993, pending.

BACKGROUND OF THE INVENTION

This invention relates generally to filters for filtering and separating fluids. More particularly, the present invention relates to fuel filters for removing foreign particles and separating water from the fuel of the fuel supply system of an internal combustion engine.

Diesel fuel supplies frequently contain significant quantities of abrasive particles and water which present the potential for permanent damage to the components of the fuel injection pump, the fuel delivery system and the engine. Consequently, an effective fuel filter as a practical necessity is conventionally incorporated into the fuel supply system of a diesel engine. A multitude of conventional fuel filters employ a disposable filter cartridge which is replaced at pre-established intervals of filter usage. Such fuel filters perform the dual function of removing particulate material from the diesel fuel and separating water from the fuel.

U.S. Pat. No. 4,976,852 and U.S. Pat. No. 5,084,170, which are assigned to the assignee of the present invention, disclose fuel filter assemblies to which the present invention relates. The fuel filters employ a base which mounts a disposable filter cartridge. In some disclosed embodiments, the cartridge includes a single stage filter system wherein fuel flows axially and radially to a filter element for removing particulate matter. The filter element also functions as a water barrier. Filtered fuel flows axially and exits through an outlet passage of the base. The water may be collected in a sump and periodically removed. The cartridge is secured to the base by a collar which engages against a roll seam structure of the cartridge.

For most, if not all diesel fuel delivery systems, as fuel circulates through the fuel filter, air pockets are formed in the fuel filter. The air pockets normally form at the top of the fuel filter. Air bubbles tend to form in the fuel as a result of gassing when the fuel is exposed to changes in pressure. For pressurized fuel delivery systems, the air pockets tend to disintegrate over time and/or the stream of bubbles present in the fuel is of a relatively small magnitude. The air pockets generally do not result in the formation of large air bubbles in the fuel supply partly due to the vapor pressure of the pressurized fuel. Consequently, for pressurized systems, air pockets in the fuel filter do not present a significant problem or obstacle to the circulation of fuel through the fuel filter and the delivery of fuel to the engine.

However, in vacuum applications, the formation of air pockets in the fuel circulating through the filter can present a more significant problem. The air pockets are much more resistant to absorption over time in vacuum systems. Moreover, the vacuum suction exerted may result in the formation of tiny air bubbles or "gassing" in the fuel. This is especially true as the filter element approaches the end of its useful life and the pressure drop across the filter media increases. This increasing restriction to flow causes more air to be pulled from the fuel as the differential pressure between the clear side and the dirty side increases. In of themselves, these individual tiny bubbles do not present a problem to normal vehicle operation as they are easily ingested by the fuel injection pump. When subjected to pump charging pressures, the tiny bubbles are ordinarily reabsorbed by the fuel.

The problems in vacuum suction systems initially arise on the clean side of the filter element where the small bubbles inevitably collect, agglomerate and form air pockets, e.g., large bubbles. The large bubble formation will continue over a period of time until the physical attitude of the filter element changes due to vehicle maneuvering, etc. When these relative large air pockets or bubbles escape into the fuel flow, they are not easily ingested and may cause engine operating problems such as stalling or engine misfire.

SUMMARY OF THE INVENTION

Briefly stated, the invention in a preferred form is a fuel filter assembly which incorporates a filter cartridge having an internal vent to control air bubble formation and its adverse effects. The invention implements a controlled bleed path within the filter cartridge to meter the stream of air bubbles in the fuel supply exiting the filter.

The fuel filter is preferably of a type which includes a base which has a fuel inlet and a fuel outlet. A conduit interiorly defines a first axial passage which communicates with the inlet. A second conduit surrounds the first conduit and defines a second axial passage. The second axial passage communicates with the outlet.

The filter cartridge, which is mountable to the base, preferably includes at least one pleated filter element. The filter cartridge has a central axial bore that is dimensioned to receive the conduits. A sealing grommet mounted at the bore upper opening diametrally fluidically seals against the outer conduit. A first conduit disposed in the filter cartridge bore extends upward from a medial plate. A second sealing grommet mounted adjacent the first conduit upper end diametrally seals against the inner base conduit. Fluted baffles angularly disposed on the first cartridge conduit outer surface are in fluid communication with the second base outlet conduit. A vent orifice opens radially through the first cartridge conduit above the second sealing grommet. The orifice is dimensioned and located to limit and control the rate of escape and the size of air bubbles. The baffles define a flow path which tends to separate air bubbles from the fuel and thereby form an upper bubble collection zone within the cartridge since the bubbles tend to resist traversing downwardly around the baffles.

An object of the invention is to provide a new and improved fuel filter adaptable for use in filtering fuel supplied to an internal combustion engine.

Another object of the invention is to provide a new and improved fuel filter of efficient low cost construction which is especially adapted for incorporation into a fuel supply system which operates under a vacuum.

A further object of the invention is to provide a new and improved fuel filter which employs a disposable cartridge incorporating improved means for controlling the flow rate and size of air bubbles in the fuel supply exiting the filter.

Other objects and advantages of the invention will become apparent from the drawings and the specification.

DETAILED DESCRIPTION OF THE PREFERRED EMBODIMENTS

Figure 1:
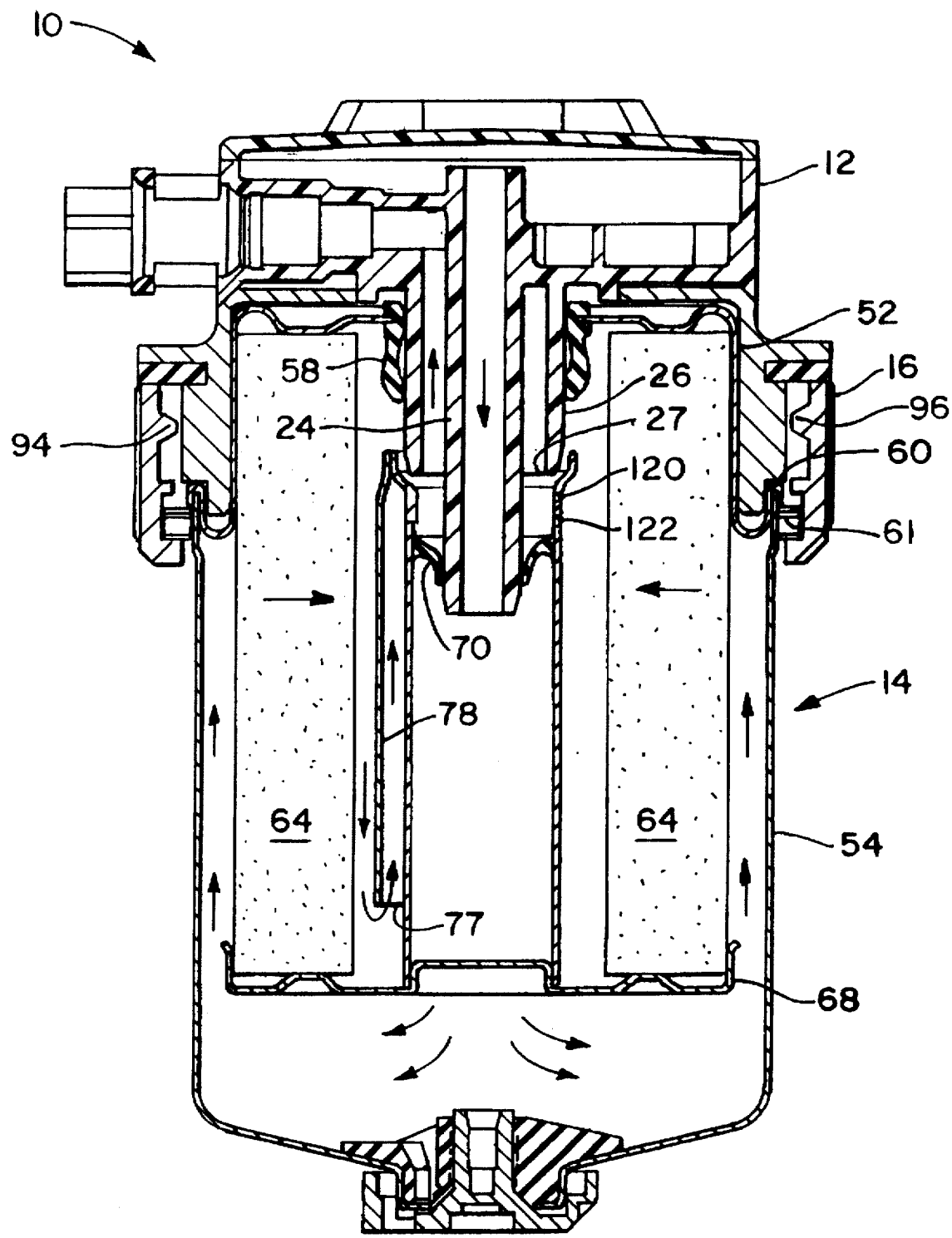
FIG. 1 is a sectional view of a fuel filter assembly in accordance with one embodiment of the invention.

With reference to the drawings wherein like numerals represent like parts throughout the several figures, a fuel filter assembly in accordance with the present invention is generally designated by the numeral 10. Fuel filter assembly 10 comprises a module or base 12 and a disposable filter cartridge 14. The base 12 is disposed generally above the disposable filter cartridge 14 which is locked to the base by means of a retainer collar 16. The fuel filter assembly is especially adapted for incorporation into the fuel supply system of an internal combustion engine (not illustrated), such as a diesel engine, for removing particulate matter from fuel and separating the water from the fuel. The fuel filter assembly 10 is particularly adapted for incorporation into a fuel supply system which is operated under a vacuum.

The base 12 and the disposable cartridge 14 may assume a wide variety of configurations. For the disclosed embodiment, the base is an inverted cup-like receptacle which forms a skirt defining a lower receiving cavity for upper portions of a disposable cartridge. An elongated sleeve-like conduit 24 and an outer concentric sleeve-like conduit 26 having an axial end 27 provide generally co-axial fluid communication between the base and the disposable cartridge.

Figure 4:
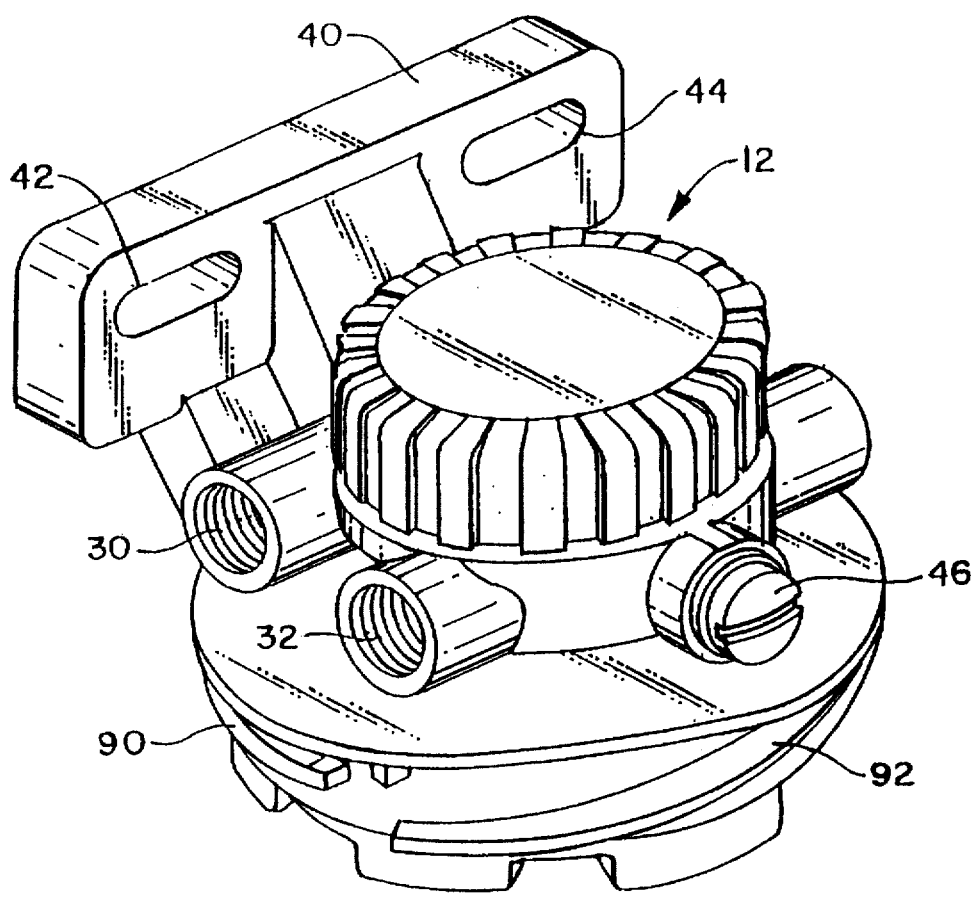
FIG. 4 is a perspective view of the base portion of the fuel filter assembly of FIG. 1.

With reference to FIG. 4, an inlet connector 30 at an upper side location of the base connects with the fuel line (not illustrated) to ultimately provide fluid communication through the interior passageway defined by the first conduit 24. An outlet connector 32 at an upper side location of the base connects with the fuel line to provide external fluid communication from the axial fluid conduit defined between the first and second conduits 24 and 26.

An integral projecting bracket 40 which may include a pair of openings 42, 44 for anchoring the filter base to the engine header extends transversely from the base. Alternately, the base may not employ the described bracket structure but instead include a pair of fastener openings for receiving mounting fasteners. The base may also have an external air vent 46.

Figure 2:
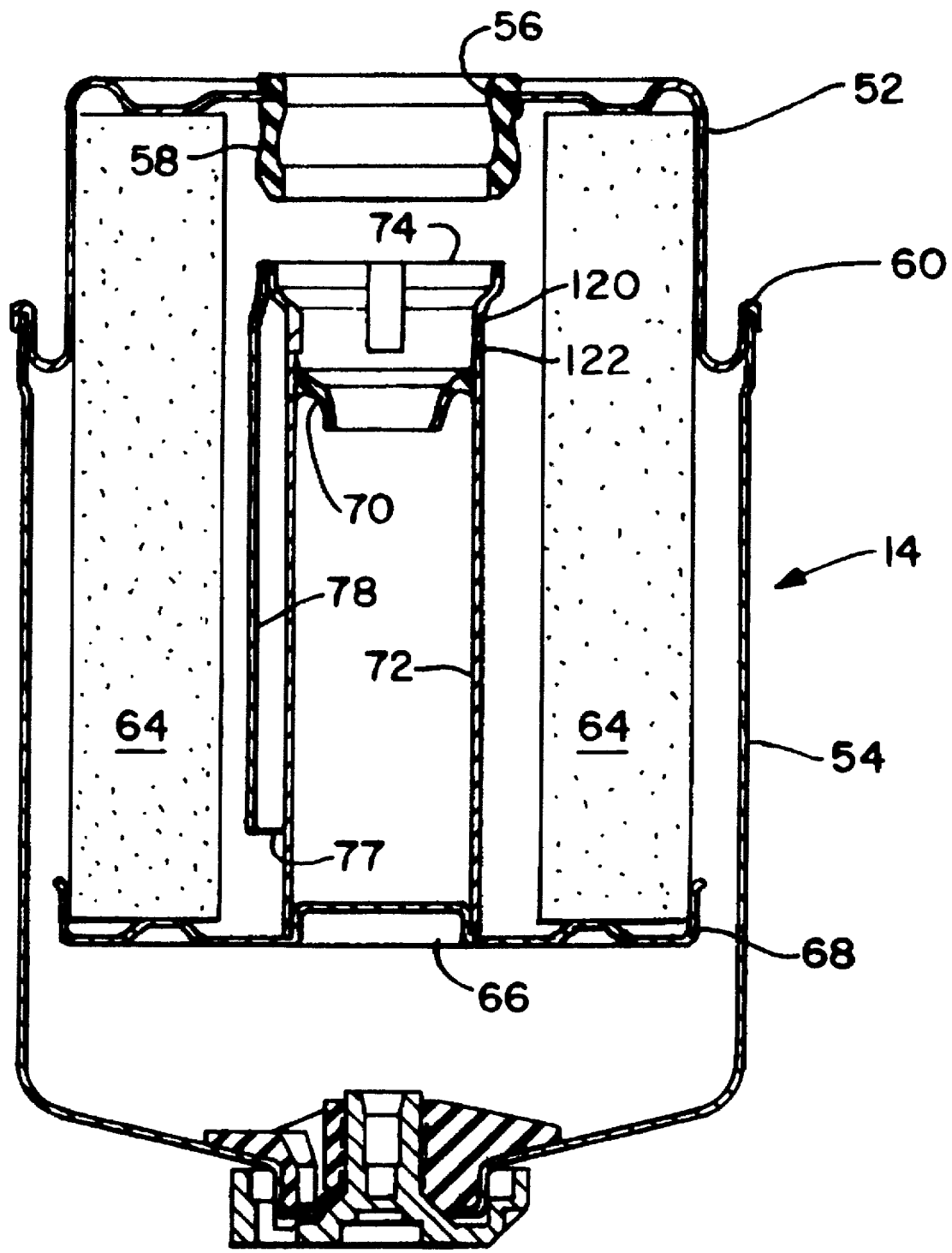
FIG. 2 is a sectional view of the fuel filter cartridge of the filter assembly of FIG. 1.
Figure 3:
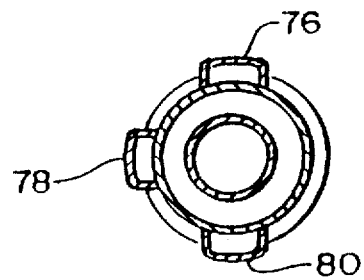
FIG. 3 is a fragmentary sectional view of the fuel filter cartridge of FIG. 1 taken along the line 3—3 thereof.

With reference to FIG. 2, the disposable filter cartridge 14 comprises a can-like enclosure formed by a pair of opposed lower and upper cup-like sections 52, 54. The sections are joined along a circumferential roll seam 60. The upper section 52, which is smaller in diameter than the lower section, is received by the base receptacle. The upper section 52 is dimensioned to be closely accommodated in the base receptacle. A central axial opening 56 in the upper section is dimensioned to receive the conduits 24 and 26. A sealing grommet 58 mounted at the opening 56 diametrally fluidically seals against the outer conduit 26.

The cartridge may employ a dual stage filter assembly or a single stage assembly as illustrated in FIGS. 1 and 2. A filter element 64 which has a continuous fan-shaped pleated configuration is mounted in the enclosure. The lower end of the element 64 is engaged by a medial plate 68 having a central opening 66. A tubular conduit 72 extends upward from the medial plate 68. The tubular conduit upper end 74 defines a flange which receives and seals against the lower end of the base second sleeve-like conduit 26. Alternatively, the upper end of the cartridge conduit may diametrally seal at its inside diameter with conduit 26.

A second sealing grommet 70 is mounted inside the tubular conduit 72 intermediate the upper end 74 and the medial plate 68. The second sealing grommet 70 diametrally seals against the base first like conduit 24. At least one axially extending fluted baffle 76 is integrally disposed on the tubular conduit 72 outer surface. The fluted baffle 76 is in fluid communication with the upper portion of the tubular conduit 72 intermediate the second grommet 70 and the upper end 74. The baffles each have an opening 77 at their lower ends and function as axial fluid passageways which ultimately communicate with the outlet conduit 26 of the base. For the illustrated embodiment, three angularly spaced fluted baffles 76, 78 and 80 are employed. The fluted baffles 76, 78 and 80 define a flow path which tends to separate the air bubbles from the fuel flow through the filter. The bubbles resist traversal around the lower end of the baffles through the openings 77. Consequently, a bubble collection zone is created and continuously maintained at the upper portion of the cartridge on the clean side of the filter. The baffles 76, 78 and 80 thus function as barriers to the bubble flow from the filter cartridge.

At least one vent orifice 120 opens radially through the tubular conduit 72 intermediate the second sealing grommet 70 and the flange at the upper end 74. In the embodiment shown in FIGS. 2, 5 and 6, the vent orifice 120 is located adjacent the upper end 74 of the tubular conduit 70. The orifice 120 is dimensioned and located to limit the size of air bubbles and to meter the flow of collected air bubbles to the upper end of conduit 72 and to the outlet conduit 26. A second vent orifice 122 which is axially spaced from the first vent orifice 120, i.e., below orifice 120, functions as a metering orifice if orifice 120 becomes plugged. The diameters of orifices 120 and 122 in one embodiment are each approximately 0.015 inches. The base may include a pair of integral outwardly projecting diametrically opposed ramps 90 and 92. The ramps ascend in spiral-like fashion around the base. The upper ends of the ramps are beveled. The collar includes a pair of diametrically disposed spiral followers 94 and 96 which integrally extend inwardly from the collar. The followers 94, 96 are dimensioned and positioned for engagement with the ramps 90, 92 so that the followers slidably engage and ascend the ramps upon alignment and angular rotation of the collar. The foregoing ramp and spring configuration may be substantially identical to that disclosed in co-pending U.S. patent application Ser. No. 07/746,693 filed on Aug. 16, 1991, which application is assigned to the assignee of the present invention and the disclosure of which is incorporated herein by reference. The collar 16 includes an inwardly projecting annular shoulder 61 which engages the roll seam 60 of the cartridge for releasably locking the cartridge to the base.

The fuel enters the fuel filter assembly through the fuel inlet passage and exits the filter through the outlet passage. The general flow path of the fuel through the filter assembly is generally designated by the FIG. 1 arrows. It will be appreciated that the fuel flow path initially axially traverses through the interior of the inner conduit 24. The circulation path extends generally axially upwardly and generally radially through the filter element 64 with the return flow path through the fluted baffles 76, 78 and 80 and traversing between the inner conduit 24 and the outer conduit 26.

Figure 5:
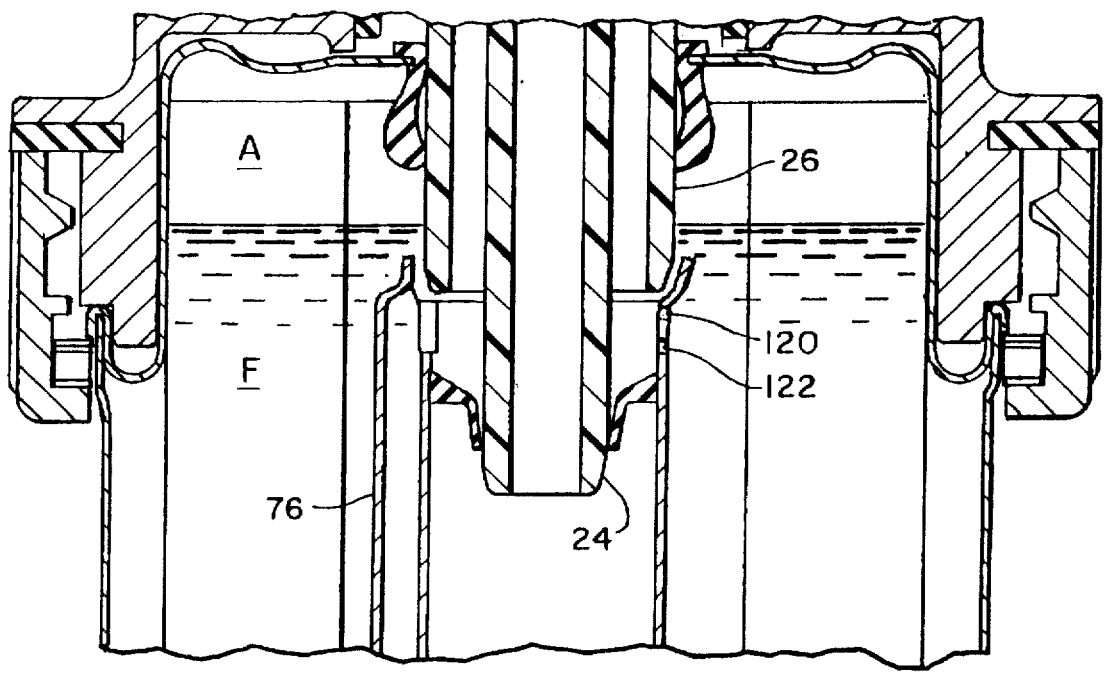
FIG. 5 is an enlarged fragmentary sectional view, partly in schematic, of the fuel filter assembly of FIG. 1 illustrating the invention for a first fuel level.

With reference to FIG. 5, when the level of fuel F is above the orifice 120, fuel bleeds into the return passageway between conduits 24 and 26. The lower portion of the return passageway is filled with fuel. The orifice allows for a generally continuous bleeding of fuel between the interior chamber formed by the secondary element 64, the upper portion of conduit 72 and the lower end of conduit 26, provided the level of fuel F in the filter is at or above the height of the orifice 120. When the filter is initially filled such as with a hand primer, the fuel level will ordinarily not level off or deadhead within the filter cartridge until the fuel level covers the orifice 120. Therefore, the air space A above the fuel F will be limited by the position and dynamics of the orifice 120.

Figure 6:
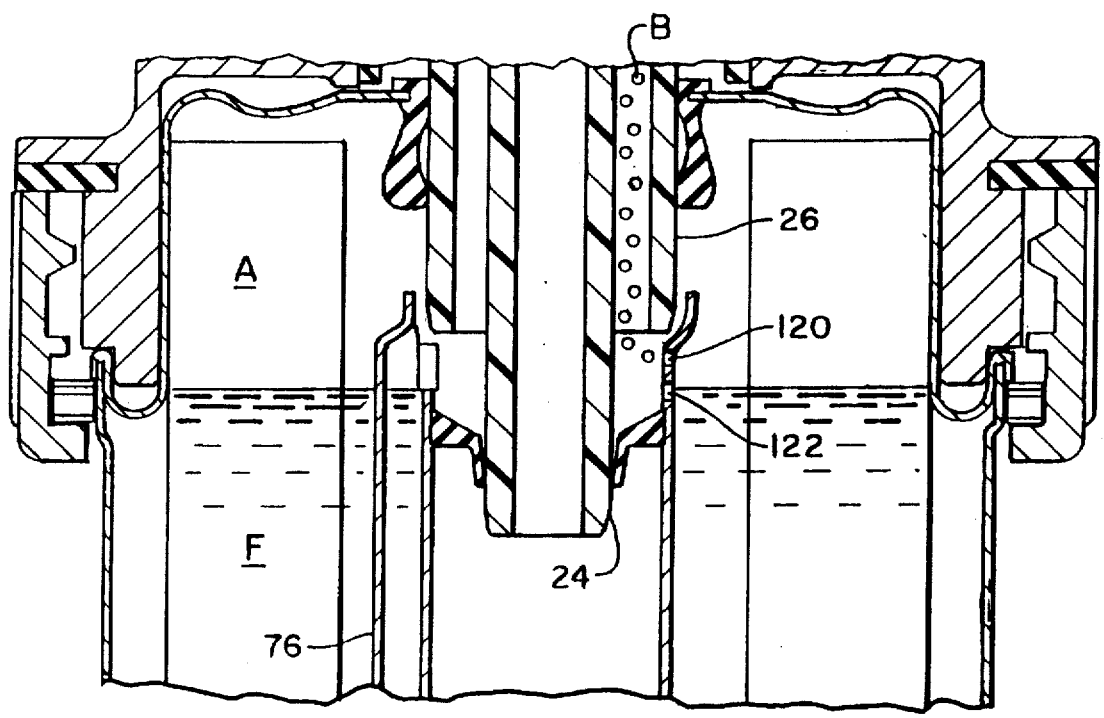
FIG. 6 is an enlarged fragmentary sectional view, partly in schematic, of the fuel filter assembly of FIG. 1 illustrating the invention for a second fuel level.

The orifice 120 functions as a bleed vent to control the formation of air bubbles in the return fuel flow path particularly as the level of the fuel in the filter changes, such as may, for example, result from vehicle movement or cartridge attitude shifts. When the engine is started, a vacuum head draws fuel upwardly through the return passageway between conduits 24 and 26. If the level of fuel descends to a position which at least partially uncovers orifice 120, such as illustrated in FIG. 6, air will bleed in a controlled fashion through the orifice 120 into the filtered fuel traversing the return passageway. The intermittent stream of air bubbles B will have no or a negligible effect on the delivery of fuel since the bubbles B will be relatively small in size. The orifice 120 functions to meter the flow of tiny bubbles above the fuel level by providing the air bleed to the return passage. The baffles function as barriers to limit the flow of bubbles to the outlet stream from the clean side of the filter element and to cause the bubbles to collect and be essentially stored at the interior top portion of the cartridge on the clean side of the filter.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fuel filter cartridge comprising:

container means for forming a housing defining an axis and having a first end defining an axial opening, an axially spaced second end, and first sealing means mounted in said axial opening;

filter means disposed in said housing comprising a filter element having a first end and an axially spaced second end and defining a central inner region on one side of said element and an outer region on the opposing side of said element;

endcap means mounted to said filter element second end, said endcap means defining a central opening;

conduit means disposed in said filter element inner region, said conduit means having axially opposite first and second ends, said second end of said conduit means being adjacent said first sealing means, said first end of said conduit means being mounted to said endcap means wherein said conduit means is substantially coaxial with said central opening;

second sealing means mounted in said conduit means intermediate said first and second ends for sealing about a sleeve received in said conduit means;

baffle means mounted to said conduit means and defining an axial passage, said baffle means being in fluid communication with said conduit means intermediate said second end of said conduit means and said second sealing means; and vent means disposed in said conduit means intermediate said second end of said conduit means and said second sealing means for defining a vent orifice.

2. The fuel filter cartridge of claim 1 wherein said conduit means second end defines an annular flange.

3. The fuel filter cartridge of claim 2 wherein said vent means is located axially between said flange and said second sealing means.

4. The fuel filter cartridge of claim 1 wherein said orifice has a diameter of approximately 0.015 inches.

5. The fuel filter cartridge of claim 1 wherein said baffle means comprises a plurality of axially extending fluted baffles, said baffles being angularly spaced about said axis.

6. The fuel filter cartridge of claim 1 further comprising a second vent orifice axially spaced from said first vent orifice.

7. A fuel filter cartridge comprising:

a housing defining an axis and having a first end defining an axial opening and an axially spaced second end;

a filter element disposed in said housing, said filter element defining a central inner region on one side of said element and an outer region on the opposing side of said element;

conduit means disposed in said filter element inner region coaxial to said opening, said conduit means having axially opposite first and second ends wherein the second end of said conduit means is located axially adjacent the axial opening at the first end of said housing;

sealing means mounted in said conduit means intermediate said first and second ends for sealing about a sleeve received in said conduit means;

baffle means defining a passage disposed in generally parallel relationship to said conduit means, said passage being in fluid communication with said conduit means at a location intermediate said second end of said conduit means and said sealing means; and vent means disposed in said conduit means for defining a vent orifice.

8. The fuel filter cartridge of claim 7 wherein said conduit means second end defines a flange for receiving an end of a first sleeve and sealing said first sleeve with said conduit means.

9. The fuel filter cartridge of claim 8 wherein said vent means is located axially between said flange and said second sealing means.

10. The fuel filter cartridge of claim 7 wherein said baffle means comprises a plurality of fluted structures having axial openings, said structures being angularly spaced about said axis.

11. The fuel filter assembly of claim 7 further comprising a second orifice axially spaced from said vent orifice, said orifices being located between said sealing means and said conduit means second end.

* * * * *

UNITED STATES PATENT AND TRADEMARK OFFICE
CERTIFICATE OF CORRECTION

PATENT NO. : 5,525,225
DATED : June 11, 1996
INVENTOR(S) : Leon P. Janik and M. Craig Maxwell It is certified that error appears in the above-indentified patent and that said Letters Patent is hereby corrected as shown below:

Title page item [75], change "Maxwell M. Craig" to --M. Craig Maxwell--.

Column 6, lines 9 and 10, delete "conduit means".

line 10, after "end" insert --of said conduit means--.

Signed and Sealed this

Tenth Day of December, 1996

Attest:

BRUCE LEHMAN

Attesting Officer          Commissioner of Patents and Trademarks